(12) United States Patent
Greaves et al.

(10) Patent No.: US 7,670,668 B2
(45) Date of Patent: Mar. 2, 2010

(54) ROOF COVERINGS MADE WITHOUT ROOFING GRANULES

(75) Inventors: Gerald G. Greaves, Granville, OH (US); David R. Jones, IV, Tampa, FL (US); Christina M. Wise, Granville, OH (US); Hugues L. Jacquemin, Ann Arbor, MI (US)

(73) Assignee: Owens Corning Intellectual Capital, LLC DE (US)

( * ) Notice: Subject to any disclaimer, the term of this patent is extended or adjusted under 35 U.S.C. 154(b) by 128 days.

(21) Appl. No.: 11/323,619

(22) Filed: Dec. 30, 2005

(65) Prior Publication Data

US 2006/0172643 A1 Aug. 3, 2006

Related U.S. Application Data

(63) Continuation-in-part of application No. 10/335,050, filed on Dec. 31, 2002.

(51) Int. Cl.
*D06N 7/04* (2006.01)
*B32B 27/12* (2006.01)

(52) U.S. Cl. .......... 428/142; 442/59; 442/104; 442/136; 442/148; 442/164; 442/167; 442/170; 442/171; 442/364; 442/381; 442/386; 442/389; 442/390; 442/394; 442/417

(58) Field of Classification Search .......... 442/136, 442/59, 148, 381, 394, 417, 386, 104, 167, 442/164, 170, 171, 364, 389, 390; 428/142
See application file for complete search history.

(56) References Cited

U.S. PATENT DOCUMENTS

| 1,604,339 | A | 10/1926 | Cumfer |
| 1,805,292 | A | 5/1931 | Mosher |
| 2,066,657 | A | 1/1937 | Stevens |
| 3,581,779 | A | 6/1971 | Sylvia |
| 3,813,280 | A | 5/1974 | Olszyk et al. |
| 3,844,878 | A | 10/1974 | Price |
| 5,434,009 | A | 7/1995 | Urbanek |
| 5,571,596 | A | 11/1996 | Johnson |
| 5,811,180 | A | 9/1998 | Berdahl |
| 6,408,593 | B1 | 6/2002 | Foster et al. |
| 6,454,848 | B2 | 9/2002 | Sliwinski et al. |

(Continued)

FOREIGN PATENT DOCUMENTS

EP 1 407 878 4/2004

(Continued)

OTHER PUBLICATIONS

International Search Report PCT/US2006/048149 dated Jun. 1, 2007.

*Primary Examiner*—Norca L Torres-Velazquez
(74) *Attorney, Agent, or Firm*—James J. Dottavio; Joan N. Drew (57) ABSTRACT

A roof covering includes a coated roofing mat comprising a roofing mat coated with an organic-based coating material. A reflective layer comprising a layer of an infrared reflective material covers an upper surface of the coated roofing mat. A weatherable layer comprising a layer of a weatherable material covers an upper surface of the reflective layer. The roof covering does not include roofing granules.

16 Claims, 5 Drawing Sheets

U.S. PATENT DOCUMENTS

| | | |
|---|---|---|
| 6,790,307 B2 | 9/2004 | Elliott |
| 6,872,440 B1 | 3/2005 | Kiik et al. |
| 7,070,843 B2 | 7/2006 | Bartek et al. |
| 2004/0014385 A1 | 1/2004 | Greaves, Jr. et al. |
| 2004/0081789 A1 | 4/2004 | Kim |
| 2005/0007480 A1 | 1/2005 | Hamano et al. |
| 2005/0072114 A1 | 4/2005 | Shiao et al. |
| 2005/0142329 A1 | 6/2005 | Anderson et al. |
| 2005/0145139 A1 | 7/2005 | Khan et al. |
| 2005/0210808 A1 | 9/2005 | Larson et al. |
| 2005/0257875 A1 | 11/2005 | Khan et al. |
| 2005/0261407 A1 | 11/2005 | Khan et al. |
| 2006/0172643 A1 | 8/2006 | Greaves et al. |
| 2006/0196130 A1 | 9/2006 | Mantyla et al. |
| 2006/0196596 A1 | 9/2006 | Bartek et al. |
| 2007/0054576 A1 * | 3/2007 | Kalkanoglu et al. ........... 442/59 |

FOREIGN PATENT DOCUMENTS

| | | |
|---|---|---|
| GB | 2 080 196 | 2/1982 |
| JP | 4250250 | 9/1992 |

* cited by examiner

ROOF COVERINGS MADE WITHOUT ROOFING GRANULES

CROSS REFERENCE TO RELATED APPLICATIONS

The present application is a continuation-in-part of U.S. application Ser. No. 10/335,050 filed Dec. 31, 2002, which is incorporated by reference herein in its entirety.

BACKGROUND OF THE INVENTION

This invention relates in general to roof coverings, and in particular to roof coverings such as asphalt-based roofing shingles that are conventionally protected with a top layer of roofing granules.

Current asphalt-based roofing shingles include an upper surface of roofing granules that helps to protect the shingles from weathering. A recent development is the use of roofing granules coated with reflective pigments that reflect solar radiation. Known as "cool granules", these roofing granules help to reduce the costs of cooling buildings such as homes that are covered by the roofing shingles. One disadvantage of using roofing shingles with cool granules is that the rough granulated surface provides opportunities for the light to be absorbed, so that it is only possible to achieve a solar reflectivity of about 25% with these granules. Another disadvantage is that these granules are pastel colored, and customers often prefer darker colored shingles. A further disadvantage of cool granules is their high cost, currently about five times the cost of conventional roofing granules.

It is known to make roof coverings without roofing granules. For example, U.S. Patent Application Publication No. 2005/0210808 discloses a roofing membrane including a roofing mat coated with a thermoset or thermoplastic polymer or a polymer-modified bitumen, and is preferably selected from polyvinyl chloride and other resinous compositions containing polyvinyl chloride, CSPE, CPE, EPDM, APP modified bitumen, SBS modified bitumen, and thermoplastic olefins such as polypropylene. The membrane includes a design printed with ink on its top surface, such as an image of laid roofing. The top surface of the membrane may also be textured, for example, to simulate granules. The membrane may be sealed with one or more coatings to provide additional protection from the sun, weather or other elements.

U.S. Patent Application Publication No. 2004/0014385 discloses a roofing shingle including an asphalt-coated roofing mat, an aesthetic web on top of the coated mat, and no roofing granules. The aesthetic web may comprise a metal film or a film to simulate granules, or any other such material to provide an aesthetic top surface.

There is still a need for improved roof coverings that are made without roofing granules.

SUMMARY OF THE INVENTION

This invention relates to a roof covering including a coated roofing mat comprising a roofing mat coated with an organic-based coating material. A reflective layer comprising a layer of an infrared reflective material covers an upper surface of the coated roofing mat. A weatherable layer comprising a layer of a weatherable material covers an upper surface of the reflective layer. The roof covering does not include roofing granules.

In another embodiment, the invention relates to a roof covering including a coated roofing mat comprising a roofing mat coated with an organic-based coating material. A high temperature layer comprising a layer of a high temperature material is adjacent to and covers an upper surface of the coated roofing mat. A weatherable layer comprising a layer of a weatherable material covers an upper surface of the high temperature layer. The roof covering does not include roofing granules.

In a further embodiment, the invention relates to a roof covering including a coated roofing mat comprising a roofing mat coated with an organic-based coating material. A weatherable layer comprising a layer of a weatherable material covers an upper surface of the coated roofing mat. An aesthetic material is applied on an upper surface of the weatherable layer, or applied between the weatherable layer and the coated roofing mat. The roof covering does not include roofing granules.

DETAILED DESCRIPTION OF THE PREFERRED EMBODIMENTS

The roof covering of the invention can be any type that includes a roofing mat coated with an organic-based coating material. Preferably, the roof covering is of the type that conventionally includes a top layer of roofing granules, such as three-tab roofing shingles or laminated roofing shingles.

The roof covering can include any type of roofing mat suitable for reinforcing the roof covering, such as a web, scrim or felt of synthetic or natural fibrous materials. The fibrous materials may include, for example, mineral fibers, polymer fibers, carbon fibers, cellulose fibers, rag fibers, or mixtures of these fibers. Suitable mineral fibers may include fibers of a heat-softenable mineral material, such as glass, ceramic, rock, slag, or basalt. In one embodiment, the roofing mat is a nonwoven web of glass fibers.

The roofing mat is coated with an organic-based coating material. The coating material is based on an organic material such as a bituminous material and/or a polymeric material (e.g., a polymer, a recycled polymer stream or ground tire rubber). Any type of bituminous material suitable for coating roof coverings can be used, such as asphalt, tar, pitch, or a mixture thereof. By "organic-based" is meant that the organic material forms the continuous phase of the coating material. The coating material usually includes at least about 20% organic material by weight, and often at least about 40%. The coating material can also include various additives and/or modifiers, such as inorganic fillers or mineral stabilizers. In a typical asphalt roofing shingle, the coating material includes asphalt and a filler of finely ground inorganic particulate matter, such as ground limestone, dolomite or silica, in an amount of from about 40% to about 80% by weight of the coating material.

Figure 1:
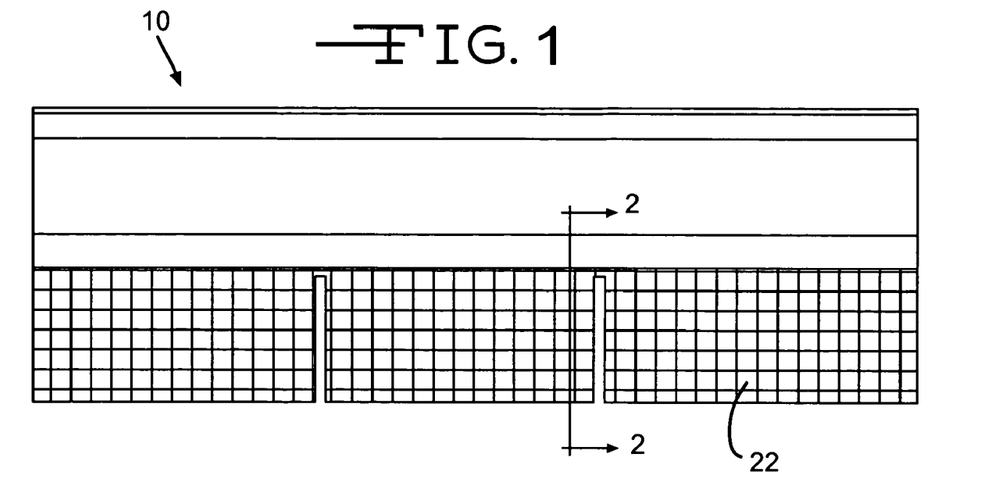
FIG. 1 is a top view of a roofing shingle according to one embodiment of the invention.
Figure 2:
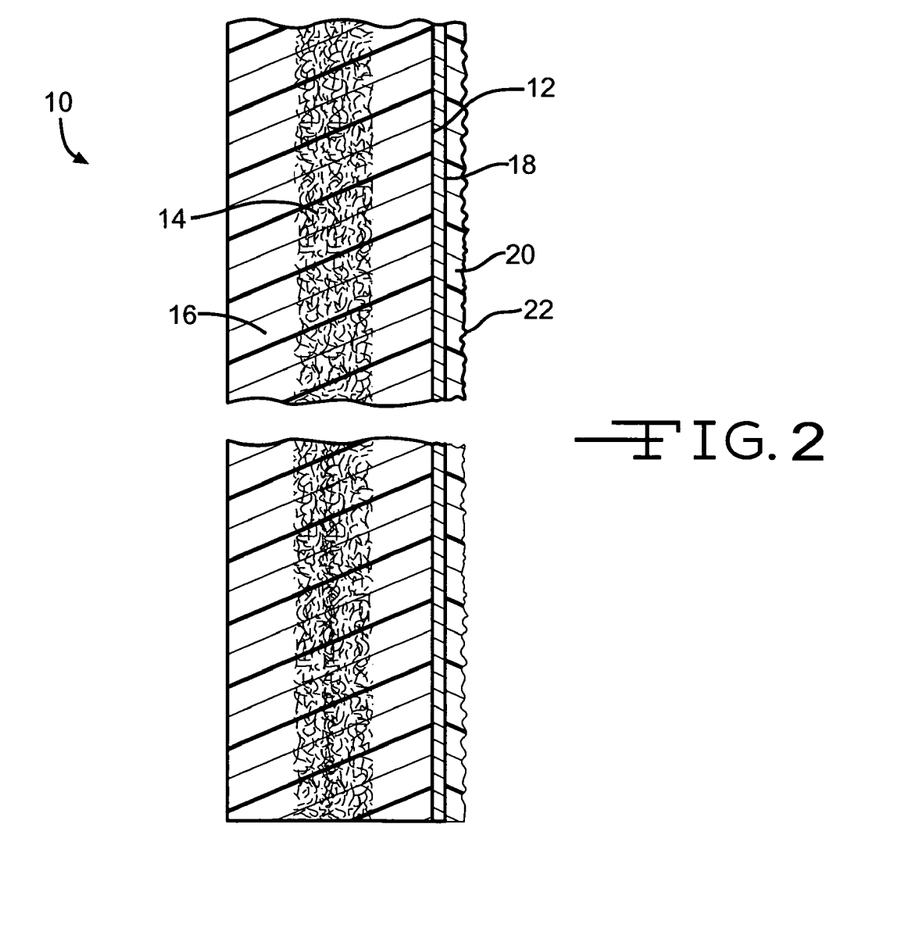
FIG. 2 is an enlarged cross-sectional view taken along line 2-2 of FIG. 1.

In contrast to conventional roofing shingles, the roof covering of the invention is weatherable without the inclusion of a top layer of roofing granules. One embodiment of a roof covering according to the invention, in the form of a three-tab roofing shingle 10, is illustrated in FIGS. 1 and 2. The roofing shingle 10 includes a coated roofing mat 12. The coated roofing mat 12 comprises a roofing mat 14 which is saturated and coated with an asphalt-based coating material 16.

The roof covering 10 also includes a reflective layer 18 covering an upper surface of the coated roofing mat 12. By "upper" or "top", as used herein, is meant the direction normally facing away from a roof when the roof covering is installed on the roof, and by "lower" or "bottom" is meant the direction normally facing toward the roof. The reflective layer 18 is adjacent to the coated roofing mat 12 in the illustrated embodiment, but it does not need to be adjacent as long as it covers the mat. By "cover", as used herein, is meant that at least about 90% of the surface area of the coated mat is covered, preferably at least about 95%, and most preferably the coated mat is substantially completely covered.

The reflective layer 18 comprises a layer of a reflective material. By "reflective", as used herein, is meant that the material has a solar reflectivity of at least about 50%, and preferably at least about 60%. Any suitable reflective material can be used in the invention. In one embodiment, the reflective layer 18 is reflective to infrared radiation in particular. An example of a suitable infrared reflective layer is a very thin layer of a reflective metal such as aluminum, copper or zinc. For example, the reflective layer may be a layer of aluminum about 200 angstroms thick. In an alternative embodiment, the reflective layer comprises the weatherable layer including a reflective material.

Optionally, it may be desirable to include a bonding material (not shown) between the reflective layer 18 and the coated roofing mat 12, to enhance the bonding of the reflective layer 18 to the asphalt-based coating material 16 of the coated roofing mat 12. This may take the form of a thin coating of bonding material applied to the reflective layer 18. Any suitable bonding material can be used, such as any of those known in the art for bonding metals to asphalt-based materials.

The roof covering 10 also includes a weatherable layer 20 that covers an upper surface of the reflective layer 18. By "weatherable", as used herein, is meant that the weatherable layer 20 passes a weathering performance test as measured by at least 60 cycles-to-failure using ASTM Method D4799. The weatherable layer 20 is adjacent to the reflective layer 18 in the illustrated embodiment, but it does not need to be adjacent as long as it covers the reflective layer. In one embodiment, the reflective layer 18 comprises a metallized coating on the lower surface of the weatherable layer 20.

The weatherable layer 20 comprises a layer of a weatherable material. Any suitable weatherable material(s) can be used in the invention. In one embodiment, the weatherable layer is made with a polymer that can form a weatherable layer by itself or with additive(s) or other modification. Some nonlimiting examples of weatherable polymers include acrylic polymers and fluorocarbon polymers (e.g., Teflon®). A nonlimiting example of a polymer that can be made weatherable with additive(s) or other modification is polyethylene terephthalate ("PET"), for example, in the form of a PET film.

The weatherable layer 20 can have any suitable thickness. For example, the PET film may have a thickness of from about 0.025 mm to about 0.05 mm.

Preferably, the weatherable layer 20 is also a high temperature layer, which means that it does not substantially melt and that it remains intact if it is applied to molten organic-based coating material (e.g., molten asphalt) during the manufacture of the roof covering. For example, the weatherable layer 20 may have a melting point above about 180° C., preferably above about 200° C., more preferably above about 220° C., and most preferably above about 240° C. If desired or necessary, the weatherable layer 20 may contain additive(s) to raise the melting point.

The weatherable layer 20 may optionally include other additives to improve the properties of the roofing shingle 10. For example, it may include a fire retardant and/or flame retardant material. Suitable chemical fire/flame retardants include, for example, various bromine-based compounds known in the art.

The weatherable layer 20 may be opaque, translucent or transparent. An opaque weatherable layer 20 is usually more reflective of solar radiation, in particular ultraviolet radiation which could degrade the organic-based coating material if it was absorbed. The weatherable layer 20 may be naturally opaque because of the material used to make the weatherable layer, or additive(s) can be included in the weatherable layer to increase its opacity. Any suitable opacifying additive(s) can be used, for example, any suitable type of pigment(s). In one embodiment, the opacifying pigment used may also be reflective of solar radiation, for example it may be infrared reflective in particular. Preferably, the roofing shingle 10 has a solar reflectivity of at least about 30%, more preferably at least about 35%, and most preferably at least about 40%. The solar reflectivity can be measured by any suitable test, such as the standard ASTM E903 method.

The weatherable layer 20 is usually visible when the roofing shingle 10 is installed on a roof. Consequently, the weatherable layer 20 may be colored with any desired color(s) or pattern(s) to give the roofing shingle a desired appearance. In some embodiments, the weatherable layer may include different colored portions to improve the appearance of the roofing shingle.

As shown in FIG. 2, the upper surface 22 of the weatherable layer 20 may be textured to improve its appearance and/or to increase its coefficient of friction. For example, the upper surface may be textured to provide an appearance similar to granules ("pebbled") or to provide a wood grain appearance for a shake shingle. Alternatively, the upper surface may include a matte surface, which may be achieved by including small particles in the weatherable layer or on the surface of the weatherable layer. Optionally, an external surface coating (not shown) may be applied on the upper surface of the weatherable layer to improve its appearance and/or increase its coefficient of friction. For example, suitable high friction coating materials are known in the art.

Another option is to include an ultraviolet stabilizing material in an external surface coating (not shown) applied on the upper surface of the weatherable layer, or included as an additive in the weatherable layer. Such a material would improve the weatherability and/or color stability of the weatherable layer. Any suitable material(s) can be used for this purpose, such as an acrylic coating.

Conventional roofing shingles achieve algae resistance by using roofing granules that leach copper onto the shingle surface thus poisoning the algae. The amount of copper leaching out is very small, but there are growing concerns about releasing copper into the environment. Advantageously, the roof covering of the invention may be algae resistant even though the roof covering does not include roofing granules that leach copper. Preferably, at least the upper surface of the weatherable layer 20 is algae resistant, and more preferably the entire weatherable layer is algae resistant. The algae resistance may be achieved because of the material(s) used to make the weatherable layer. For example, many polymers, including PET, are resistant to algae. Optionally, the algae resistance of the weatherable layer can be improved by including suitable additive(s).

The roofing shingle 10 may also include an aesthetic material to improve the appearance of the roofing shingle. This is not shown in FIGS. 1 and 2 but is illustrated in other figures and described more fully below in relation to other embodiments of the invention. The aesthetic material may be applied on the upper surface 22 of the weatherable layer 20. In such a case, it may be desirable to use an aesthetic material that is weatherable and/or reflective. Alternatively, the weatherable layer 20 may be transparent or translucent, and the aesthetic material may be applied between the weatherable layer and the reflective layer, or it may be included as part of the reflective layer. For example, the aesthetic material may be applied in a pattern on a lower surface of the weatherable layer. In such a case, the aesthetic material is visible through the transparent or translucent weatherable layer, and it is protected from the elements.

Figure 3:
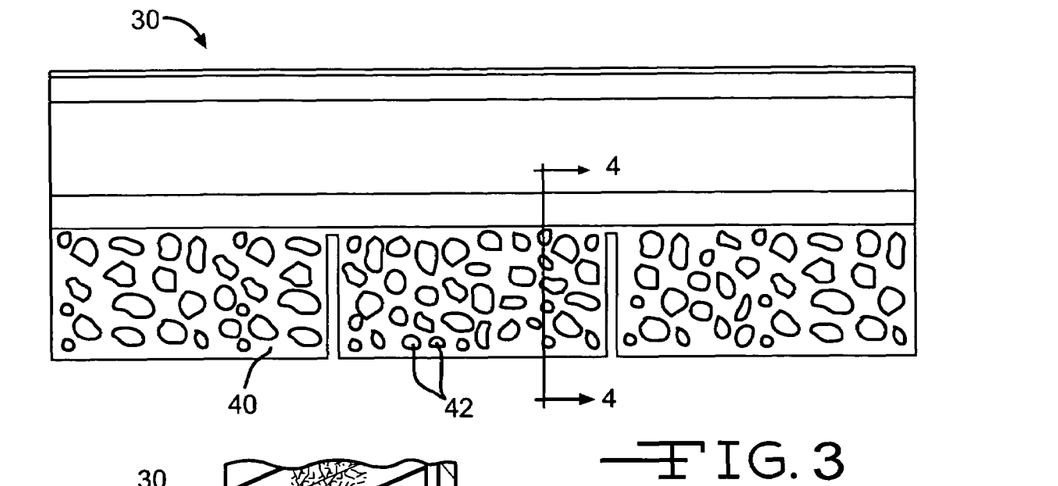
FIG. 3 is a top view of a roofing shingle according to another embodiment of the invention.
Figure 4:
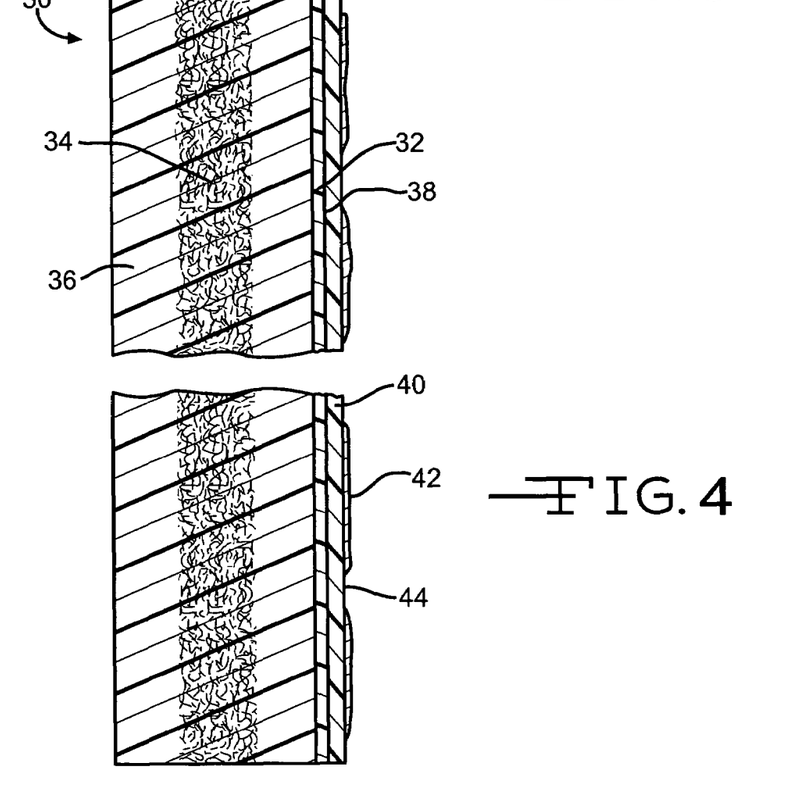
FIG. 4 is an enlarged cross-sectional view taken along line 4-4 of FIG. 3.

FIGS. 3 and 4 illustrate another embodiment of a roofing shingle 30 according to the invention. The roofing shingle 30 includes a coated roofing mat 32 comprising a roofing mat 34 coated with an asphalt-based coating material 36. The roofing shingle 30 also includes a high temperature layer 38 adjacent to and covering an upper surface of the coated roofing mat 32. As discussed above, by "high temperature layer" is meant that the layer does not substantially melt and that it remains intact if it is applied to molten organic-based coating material (e.g., molten asphalt) during the manufacture of the roof covering.

The high temperature layer 38 comprises a layer of a high temperature material. In one embodiment, the high temperature layer is made with a polymer that has a high enough melting point by itself or with additive(s) or other modification. For example, the high temperature layer may be made with a PET film. Some other high temperature polymers may include acrylic polymers. The high temperature layer can have any suitable thickness. For example, the PET film may have a thickness of from about 0.025 mm to about 0.05 mm. While a preferred embodiment described above includes a film, the high temperature layer and/or weatherable layer and/or reflective layer may comprise a coating applied to the surface using an extruder, a powder coating, or a liquid sprayed, rolled, extruded, or otherwise applied to the surface in a manner known to one skilled in the art.

The roofing shingle 30 also includes a weatherable layer 40, such as described above, covering an upper surface of the high temperature layer 38. Some examples of weatherable polymers for making the weatherable layer include acrylic polymers and fluorocarbon polymers. If acrylic or other polymers are used in both the high temperature layer and the weatherable layer, they are different or modified such that the two layers are different from one another.

In some embodiments of the invention, the weatherable layer is also impact resistant. For example, the weatherable layer is resistant to impacts by hail when the roofing shingle is installed on a roof. By "impact resistant", as used herein, is meant that the weatherable layer passes at least the Class 1 test of the UL 2218 test, "Standard for Impact Resistance of Prepared Roof Covering Materials", Underwriters Laboratories, May 31, 1996. The weatherable layer can be made impact resistant by any suitable means, for example, by using a weatherable elastomeric polymer such as an elastomeric acrylic polymer or other elastomeric polymer of the types mentioned above.

FIGS. 3 and 4 illustrate the inclusion of an aesthetic material 42 to improve the appearance of the roofing shingle. Any suitable type(s) of aesthetic material 42 may be used, for example, a colored or uncolored surface coating material such as an ink or a paint. In the embodiment shown, the aesthetic material 42 is applied on the upper surface 44 of the weatherable layer 40. In such a case, it may be desirable to use an aesthetic material that is weatherable and/or reflective. A line of weatherable paints is available from BASF. The aesthetic material is applied in the form of drops of colored areas in the embodiment shown. If desired, more than one different color of aesthetic material can be used. Alternatively, any other desirable patterns of aesthetic material can be included on the roofing shingle The aesthetic material can be applied on the roofing shingle by any suitable method. For example, it can be applied by spraying or dropping the aesthetic material on the weatherable layer. Alternatively, it can be applied by printing the aesthetic material on the weatherable layer. Any suitable type of printing method can be used.

Figure 5:
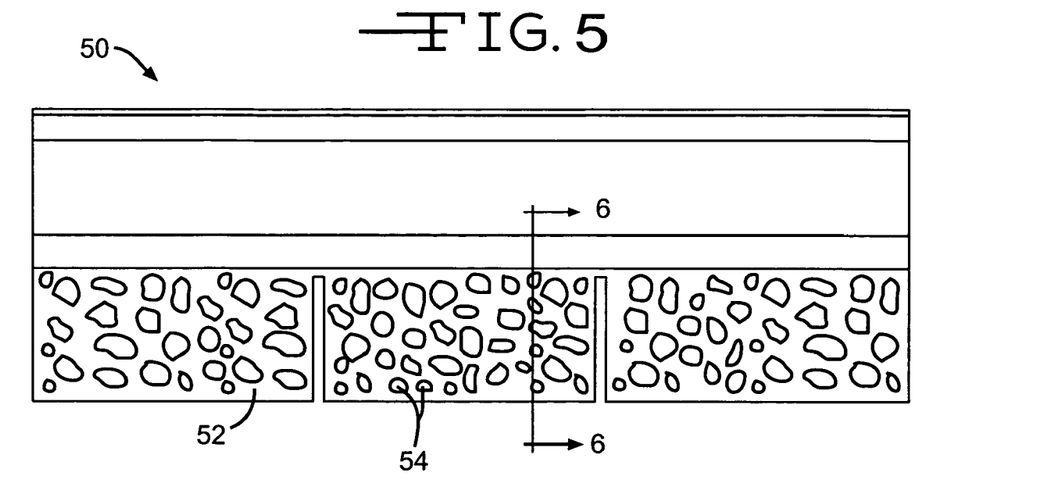
FIG. 5 is a top view of a roofing shingle according to another embodiment of the invention.
Figure 6:
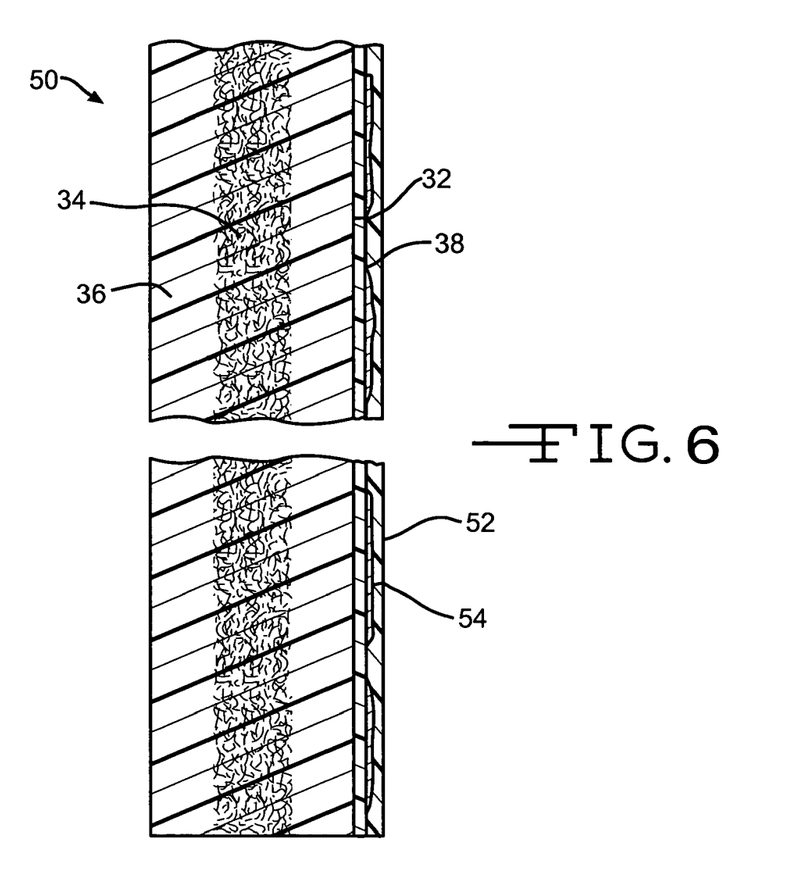
FIG. 6 is an enlarged cross-sectional view taken along line 6-6 of FIG. 5.

FIGS. 5 and 6 illustrate another embodiment of a roofing shingle 50 according to the invention. The roofing shingle 50 is like the roofing shingle 30 shown in FIGS. 3 and 4, except that the weatherable layer 52 is transparent or translucent. This allows the aesthetic material 54 to be applied between the weatherable layer 52 and the high temperature layer 38, so that the aesthetic material is protected from the elements while still being visible. In the embodiment shown, the aesthetic material is applied in a pattern on a lower surface of the weatherable layer. Again, the aesthetic material can be applied by any suitable method.

Figure 7:
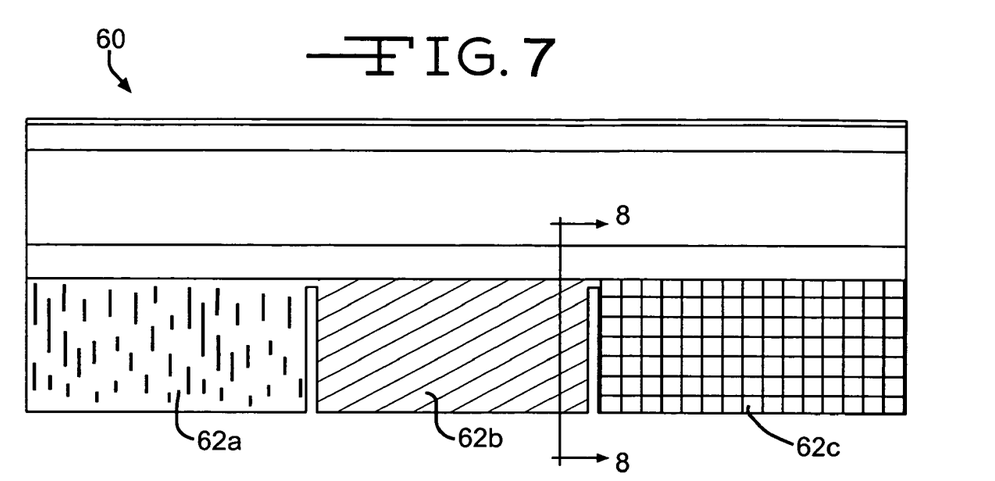
FIG. 7 is a top view of a roofing shingle according to another embodiment of the invention.
Figure 8:
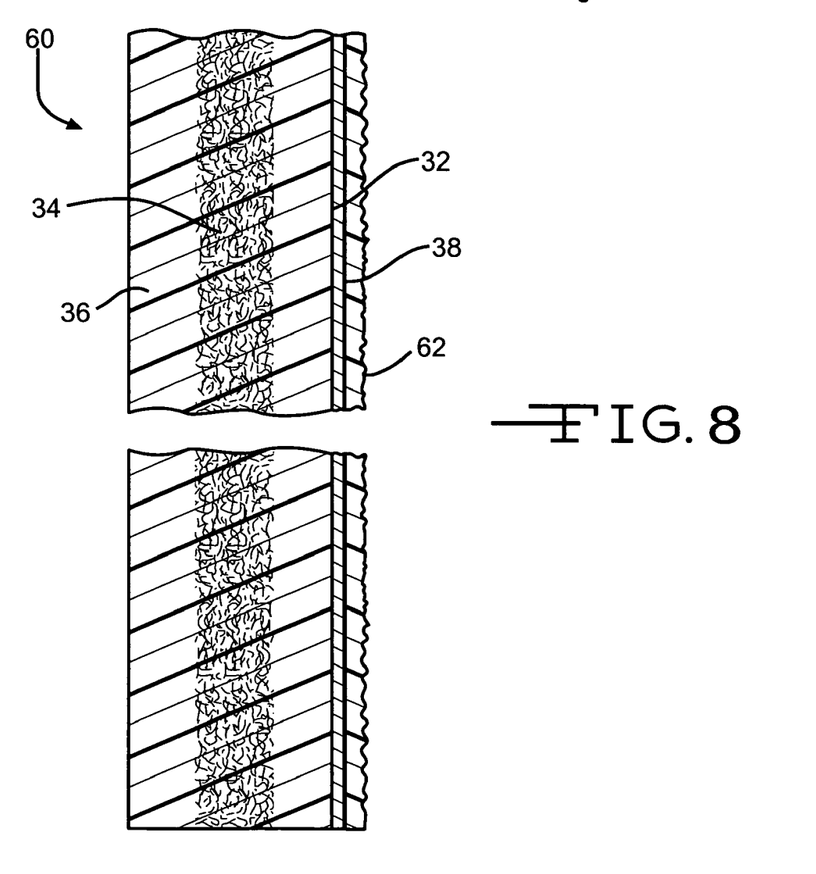
FIG. 8 is an enlarged cross-sectional view taken along line 8-8 of FIG. 7.

FIGS. 7 and 8 illustrate another embodiment of a roofing shingle 60 according to the invention. The roofing shingle 60 is like the roofing shingle 30 shown in FIGS. 3 and 4, including a high temperature layer 38 and a weatherable layer 62. However, in this embodiment of the invention, the weatherable layer 62 includes different portions 62a, 62b and 62c that are different in color, design, or other characteristic. For example, the different portions 62a, 62b and 62c can be made with differently colored acrylic polymers. The weatherable layer can include any desired pattern and colors. For example, the weatherable layer may include colors and a pattern that appears as a blend drop pattern on the shingle. The roofing shingle may be manufactured without tabs, and the weatherable layer colored and designed so that the shingle appears to have tabs. The weatherable layer may be designed and colored to give the appearance of a laminated roofing shingle. Alternatively, a laminated shingle may be constructed with a different color for the underlay and overlay (although illustrated herein as a strip shingle, such construction is commonly understood by one skilled in the art, as described in detail in commonly assigned U.S. Pat. No. 6,014,847, which is incorporated herein by reference in its entirety). The shingle manufacturing operation can be modified in any suitable way to apply the different patterns or designs as part of the weatherable layer.

Figure 9:
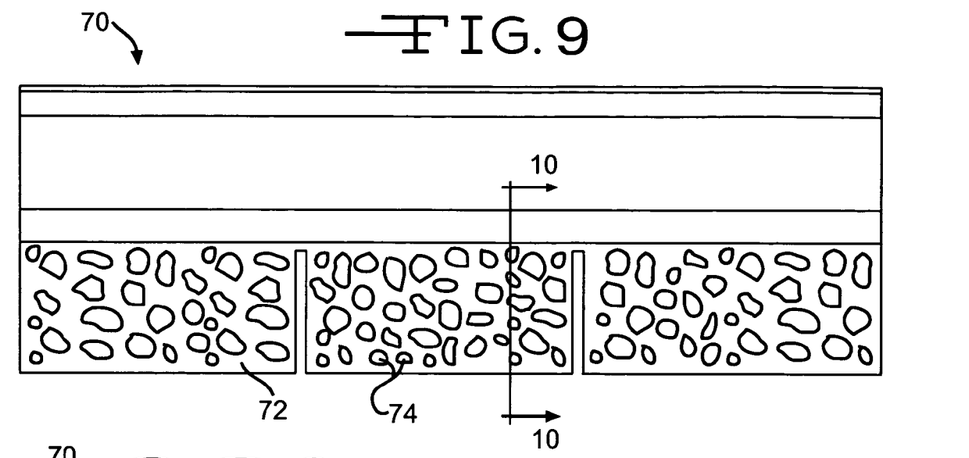
FIG. 9 is a top view of a roofing shingle according to another embodiment of the invention.
Figure 10:
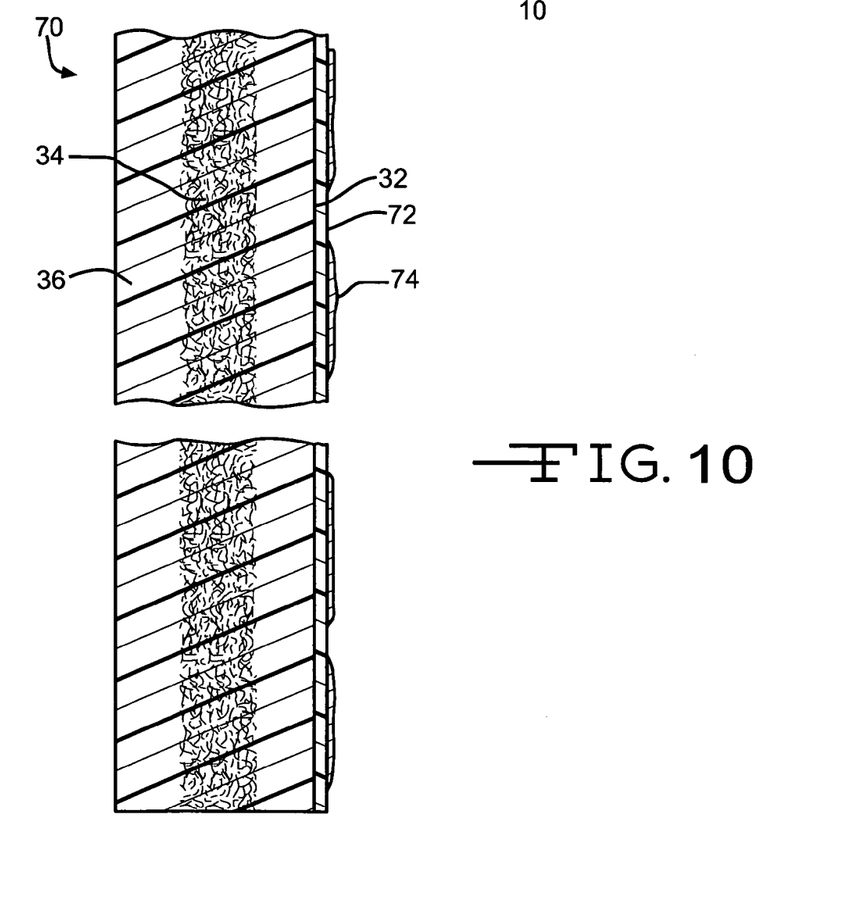
FIG. 10 is an enlarged cross-sectional view taken along line 10-10 of FIG. 9.

FIGS. 9 and 10 illustrate another embodiment of a roofing shingle 70 according to the invention. In this embodiment, the shingle 70 includes a weatherable layer 72 covering an upper surface of the coated roofing mat 32. Preferably, the weatherable layer 72 is also a high temperature layer. An aesthetic material 74 is applied on the upper surface of the weatherable layer 72. Alternatively, the aesthetic material 74 could be applied between the weatherable layer 72 and the coated mat 32 if the weatherable layer is transparent or translucent.

Although the Figures illustrate conventional shingle appearance, the present invention is not limited to these embodiments, and includes for example, rolled roofing products, laminated shingles, and other roof coverings in any configuration or appearance. Another aspect of the present invention includes the ability to coat the exposed portion of the shingle as described above, and in some instances all or part of the unexposed, or headlap portion may be uncovered by the aesthetic material, reflective layer, high temperature layer and/or weatherable layer in some instances where such properties are not required in that region. Additionally, it is contemplated that a shingle according to the present invention may be constructed so that the roof is covered in a single layer, as opposed to conventional roofing shingles having an exposed portion and a headlap portion covered by the adjacent course of shingles. Furthermore it is contemplated that a shingle according to the present invention may include a reinforcement in the nail zone area (preferably via one of the reflective layer, high temperature layer, weather able layer, or with a separate layer) as described in commonly assigned cop ending application Ser. No. 11/198,522, filed Aug. 5, 2005, which is incorporated herein by reference in its entirety. Furthermore, while described herein as a roofing shingle, the instant invention may be used as a decorative and weatherproofing coating in other areas, such as e.g. in place of siding on the side of a house or other structure (with the appropriate appearance, such as e.g. siding, bricks, manufactured stone, or other appearance), or as trailer skirting or other such applications.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A roof covering comprising:
   a coated roofing mat comprising a roofing mat coated with an organic-based coating material;
   a reflective layer comprising a layer of a reflective material covering an upper surface of the coated roofing mat, the reflective layer being adjacent to and in continuous contact with the coated roofing mat; and
   a weatherable layer comprising a layer of a weatherable material covering an upper surface of the reflective layer;
   the roof covering not including roofing granules.

2. The roof covering of claim 1 wherein the roof covering does not include an intervening layer between the reflective layer and the coated roofing mat.

3. The roof covering of claim 1 wherein the roof covering consists of the coated roofing mat, the reflective layer, and the weatherable layer.

4. The roof covering of claim 1 wherein the weatherable material comprises a polymer.

5. The roof covering of claim 1 wherein the weatherable layer is opaque.

6. The roof covering of claim 1 wherein the weatherable layer includes reflective pigments.

7. The roof covering of claim 1 wherein the weatherable layer is transparent or translucent, and the roof covering further comprises an aesthetic material between the weatherable layer and the reflective layer.

8. The roof covering of claim 1 further comprising an aesthetic material applied on an upper surface of the weatherable layer.

9. The roof covering of claim 1 further comprising a high friction material on an upper surface of the weatherable layer.

10. The roof covering of claim 1 wherein an upper surface of the weatherable layer is textured or matted.

11. The roof covering of claim 1 wherein the weatherable layer includes a fire retardant or flame retardant material.

12. The roof covering of claim 1 wherein at least an upper surface of the weatherable layer is algae resistant.

13. The roof covering of claim 1 further comprising an ultraviolet stabilizing material applied as a coating on an upper surface of the weatherable layer or included as an additive in the weatherable layer.

14. The roof covering of claim 8 wherein the aesthetic material comprises a colored surface coating material.

15. The roof covering of claim 8 wherein the aesthetic material is applied as a continuous layer of the aesthetic material.

16. The roof covering of claim 8 wherein the aesthetic material is a paint or ink.

* * * * *